United States Patent
Johnson

(10) Patent No.: US 11,036,916 B2
(45) Date of Patent: Jun. 15, 2021

(54) ALIGNING PROPORTIONAL FONT TEXT IN SAME COLUMNS THAT ARE VISUALLY APPARENT WHEN USING A MONOSPACED FONT

(71) Applicant: International Business Machines Corporation, Armonk, NY (US)

(72) Inventor: Neil Alan Johnson, Cornwall, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/205,665

(22) Filed: Nov. 30, 2018

(65) Prior Publication Data
US 2020/0175093 A1    Jun. 4, 2020

(51) Int. Cl.
G06F 17/00      (2019.01)
G06F 40/109     (2020.01)
G06F 40/106     (2020.01)

(52) U.S. Cl.
CPC .......... *G06F 40/109* (2020.01); *G06F 40/106* (2020.01)

(58) Field of Classification Search
CPC .................................................... G06F 17/214
See application file for complete search history.

(56) References Cited

U.S. PATENT DOCUMENTS

| 4,974,174 A * | 11/1990 | Kleinman | G06F 3/04845 345/662 |
| 6,006,240 A * | 12/1999 | Handley | G06K 9/00449 715/212 |
| 6,249,353 B1 * | 6/2001 | Yoshida | G06K 9/3208 358/1.11 |
| 8,396,856 B2 | 3/2013 | Jensen et al. | |
| 8,543,914 B2 | 9/2013 | Klassen | |
| 9,916,295 B1 * | 3/2018 | Crawford | G06F 17/24 |
| 2004/0006742 A1 * | 1/2004 | Slocombe | G06F 17/2205 715/234 |
| 2011/0289398 A1 * | 11/2011 | Chin | G06F 17/245 715/227 |
| 2015/0067463 A1 | 3/2015 | Chin | |
| 2019/0340240 A1 * | 11/2019 | Duta | G06F 16/3344 |

OTHER PUBLICATIONS

Balinsky et al., "Aesthetic Measure of Alignment and Regularity" DocEng'09, Sep. 16-18, 2009, Munich, Germany, Copyright 2009 ACM, p. 56-65. (Year: 2009).*

(Continued)

*Primary Examiner* — Amelia L Tapp
(74) *Attorney, Agent, or Firm* — Cantor Colburn LLP; Teddi Maranzano

(57) ABSTRACT

A computer system includes a text editor controller that receives input data, determines column location data indicating a location of at least one column for vertically organizing at least a portion of the input data based at least in part on the input data, and renders the input data as proportional font. A display device is configured to display a text area interface generated by the computer system, and to display the rendered proportional font in the text area interface in a vertically aligned manner based at least in part on the column location data.

20 Claims, 10 Drawing Sheets

(56) References Cited

OTHER PUBLICATIONS

Vanderdonckt et al., "Visual Techniques for Traditional and Multimedia Layouts," AVI '94, copyright 1994 ACM, p. 95-104. (Year: 1994).*
Hurst et al., "Review of Automatic Document Formatting," DocEng'09, Sep. 16-18, 2009, Munich, Germany, Copyright 2009 ACM, p. 99-108. (Year: 2009).*
Daan Leijen; Madoko Reference; "A Fast Scholarly Markdown Processor"; http://madoko.org; Apr. 11, 2017; Madoko 48 pages.

* cited by examiner

ALIGNING PROPORTIONAL FONT TEXT IN SAME COLUMNS THAT ARE VISUALLY APPARENT WHEN USING A MONOSPACED FONT

BACKGROUND

The invention relates generally to digital computing systems, and more particularly, to computer systems that generate code origination data.

Computer systems are utilized to generate code and display the code in an interface such as, for example, a web browser interface. The computer system typically includes a plain text generator that generates textual code according to a proportional font or a monospace font. Proportional fonts (sometimes referred to as "variable-width fonts" or "proportional-pitch fonts") are a font-type (sometimes referred to as a "typeface") in which different characters have different pitches (i.e., widths). Monospace fonts (sometimes referred to as "non-proportional fonts" or "fixed-pitch fonts") are a font-type in which the characters each occupy the same amount of horizontal space. Due to their fixed font pitch, monospace fonts are inherently aligned when arranged in a column format. On a line-by-line basis, however, monospace fonts can be difficult to read. Proportional fonts typically improve readability on a line-by-line basis. However, proportional fonts are not visually aligned vertically when arranged in columns due to their varying font pitch.

SUMMARY

According to a non-limiting embodiment, a computer system includes a text editor controller that receives input data, determines column location data indicating a location of at least one column for vertically organizing at least a portion of the input data based at least in part on the input data, and renders the input data as proportional font. A display device is configured to display a text area interface generated by the computer system, and to display the rendered proportional font in the text area interface in a vertically aligned manner based at least in part on the column location data.

According to another non-limiting embodiment, a method is provided to render text data into proportional font. The method comprises inputting the text data to a text editor controller, determining column location data, via the text editor controller, indicating a location of at least one column for vertically organizing at least a portion of the input data based at least in part on the input data, and rendering, via the text editor controller, the input data as proportional font. The method further includes generating a text area interface by a computer system, and displaying, via a display device, the rendered proportional font in the text area interface in a vertically aligned manner based at least in part on the column location data.

According to still another non-limiting embodiment, a computer program product is provided. The computer program product includes a computer readable storage medium having program instructions embodied therewith. The program instructions are executable by a computer processor to cause the computer processor to perform a method of rendering text data into proportional font. The method includes inputting the text data to a text editor controller, determining column location data, via the text editor controller, indicating a location of at least one column for vertically organizing at least a portion of the input data based at least in part on the input data, and rendering, via the text editor controller, the input data as proportional font. The method further includes generating a text area interface by a computer system, and displaying, via a display device, the rendered proportional font in the text area interface in a vertically aligned manner based at least in part on the column location data.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

DETAILED DESCRIPTION

Figure 1:
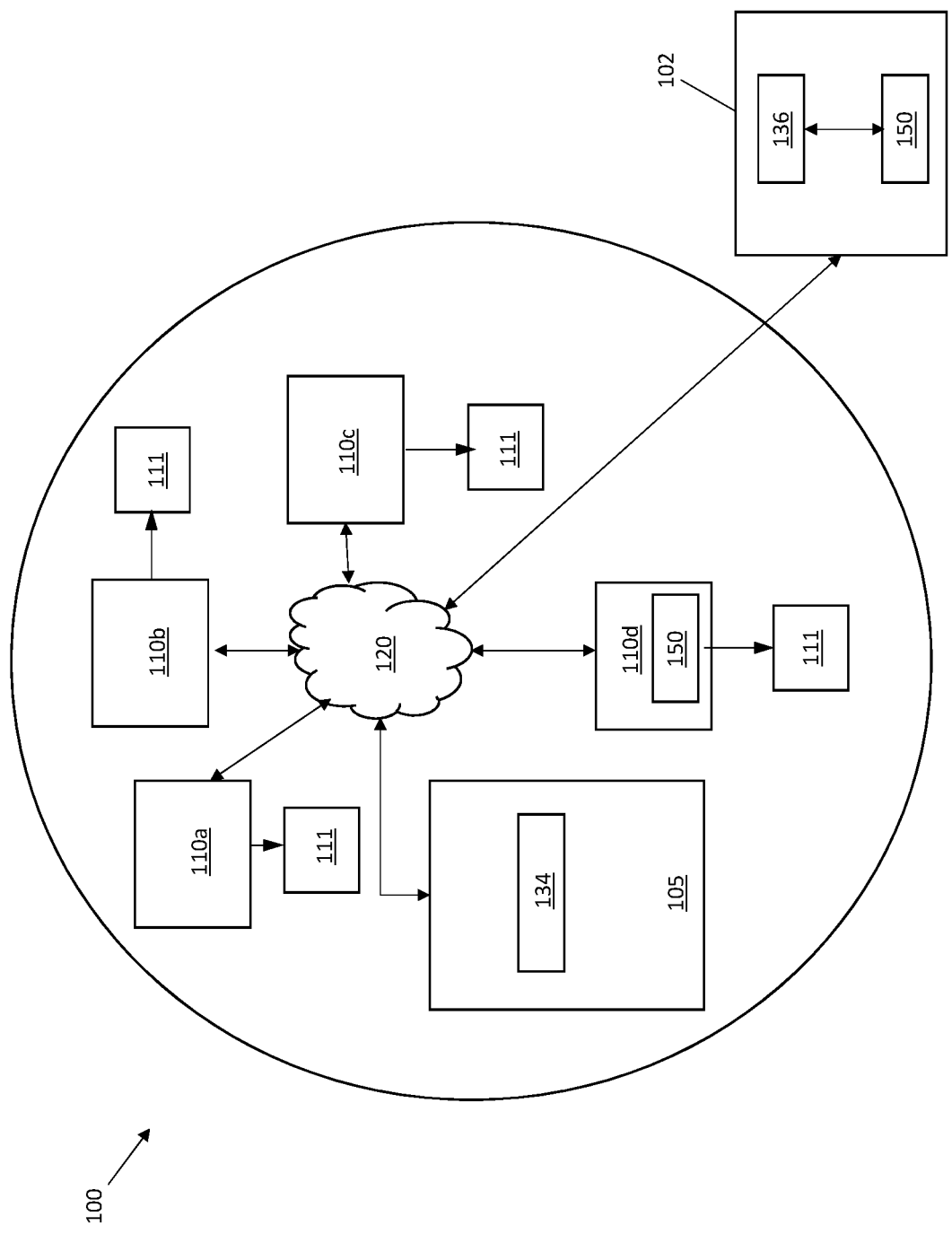
FIG. 1 illustrates an exemplary computing system capable of generating textual code according to a non-limiting embodiment.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Visually aligning text in columns is desirable when creating tables and when programming. Modern text entry is often performed using proportional fonts since this font-type generally improves readability. However, the variable-width characteristic associated with proportional fonts makes it difficult to visually align this font-type vertically within the same column. Programmers have attempted to address this issue by using monospaced fonts instead of proportional fonts, but at the expense of reducing line-by-line readability.

Another attempted solution used by programmers to resolve unaligned proportional fonts in a column is to employ a rendering/coding technique called "elastic tabstops". Using tabs, however, can be troublesome when entering text in a web page since the tab key is typically expected to move the cursor to the next field instead of entering a tab. In addition, the computer system or text editing processor must constantly analyze all lines of text to determine the left position of a column. Consequently, an excessive amount of processing resources and processing cycles are used to align the text. The elastic tabstops method also requires that the editor program support an elastic tabstops feature in order to achieve the correct column alignment with data, even if a monospaced font is used.

Various non-limiting embodiments described herein provide a computer system capable of generating proportional fonts, while automatically inserting spaces that align the text in columns to allow the proportional font to be aligned in a common column in a manner so to appear as a monospaced font. In at least one non-limiting embodiment, space sequences are utilized as column delimiters, while also using the text preceding each space sequence to determine the column position. A sequence of 2 spaces or more, for example, is then used as a column separator.

Since spaces are utilized as column separators, tabs are not required and can be utilized to navigate to the next field of a web browser. The technique implemented by the system described herein allows for improving the overall performance of the computer system itself because the left position of a column could be determined independently from other lines. That is, the computer system or text editing controller is not required to constantly analyze every line of text thereby requiring less computing processing compared to systems employing an elastic tabstops technique.

With reference now to FIG. 1, a computing system 100 capable of generating textual code is illustrated according to a non-limiting embodiment. The computing system 100 includes a management system 105 and one or more computer nodes 110A-110D (sometimes referred to as hosts), which are communicatively coupled to each other using one or more communications networks 120. The communications network 120 may include one or more servers, networks, or databases, and may use a particular communication protocol to transfer data between the computer nodes 110A-110D. A compiler system 102 may be communicatively coupled with the management system 105 and the computer nodes 110 either directly or via the communications network 120.

The management system 105 retrieves and executes programming instructions stored in memory or storage. The management system 105 is also capable of moving data, such as programming instructions and application data, to/from other devices such as, for example, one or more CPs, I/O device interfaces, storage units, network interfaces, and memory units.

The management system 105 includes a stream manager 134. The stream manager 134 is configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

The computer system 100 further includes one or more text editor controllers 150. A text editor controller 150 can be implemented in one or more computing nodes 110 and/or the compiler system 102. In this manner, a user may utilize a text editor controller 150 locally installed on a given computer node (e.g., node 110d) and/or may utilize a text editor controller 150 installed in the compiler system 102 via the communications network 120. The text editor controller 150 is configured to receive input data (i.e., input textual code), determine column location data indicating a location of at least one column for vertically organizing at least a portion of the input data, and render the input data as a proportional font. Based on the column location data, the text editor controller 150 outputs the rendered proportional font to the display 111 such that it is automatically aligned vertically in a shared column. In this manner, the rendered proportional font is displayed in vertically aligned manner similar to that of a monospace font. The operation of the text editor controller 150 is described in greater detail below.

Figure 2:
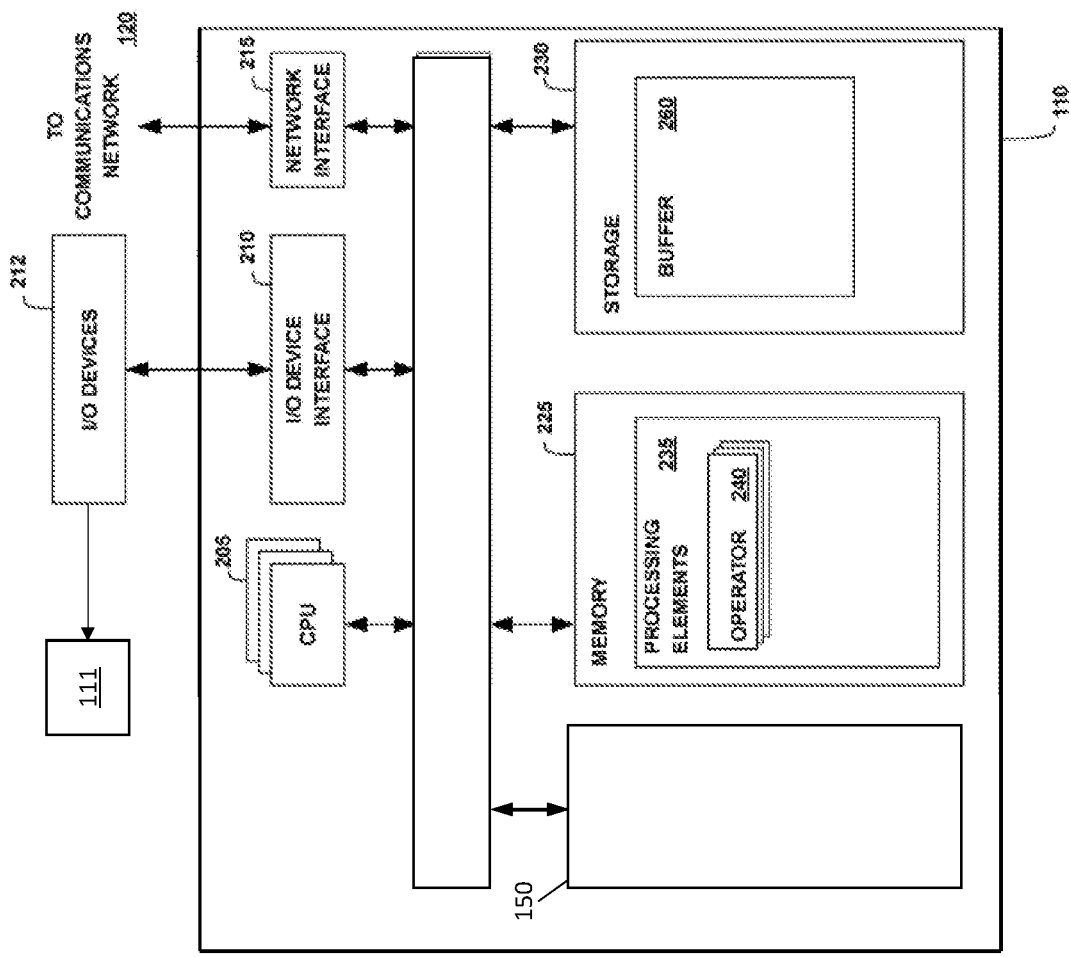
FIG. 2 illustrates a view of a computer node according to a non-limiting embodiment.

FIG. 2 is a more detailed view of a computer node 110, which may be the same as one of the computer nodes 110A-110D of FIG. 1, according to various embodiments. The computer node 110 may include, without limitation, one or more processors (CPUs) 205, a network interface 215, an interconnect 220, a memory 225, and a storage 230. The computer node 110 may also include an I/O device interface 210 used to connect I/O devices 212 such as a display device 111, e.g., monitor, display screen, etc. Other I/O devices may also be employed including, but not limited to, a keyboard, a mouse device, a printer, etc.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP).

One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same computer node 110 or on other computer nodes that are accessible via communications network 120. For example, a processing element 235 on computer node 110A may output tuples to a processing element 235 on computer node 110B.

The storage 230 may include a buffer 260. Although shown as being in storage, the buffer 260 may be located in the memory 225 of the computer node 110 or in a combination of both memories. Moreover, storage 230 may include storage space that is external to the computer node 110, such as in a cloud.

The computer node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
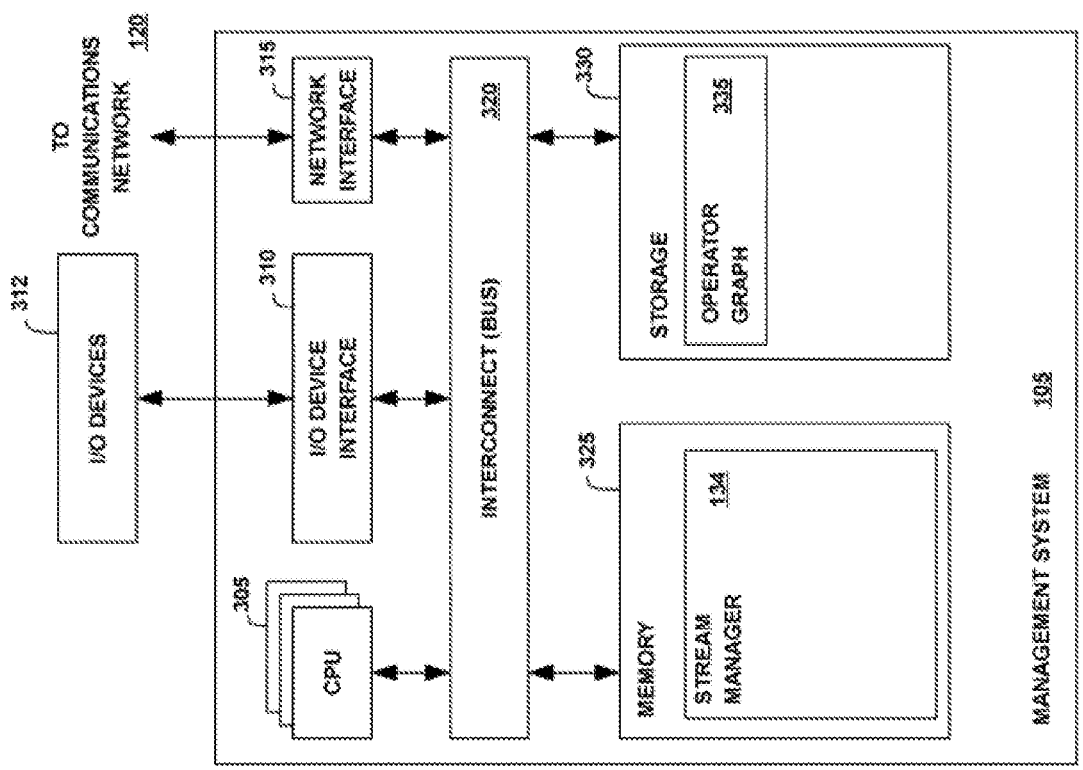
FIG. 3 illustrates a view of a management system according to a non-limiting embodiment.

Referring to FIG. 3, a management system 105 is illustrated according to a non-limiting embodiment. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area network (SAN) devices, or the cloud. The network interface 315 is configured to transmit data via the communications network 120.

The memory 325 may store a stream manager 134. Additionally, the storage 330 may store an operator graph 335. The operator graph 335 may define how data (e.g., tuples) routed to processing elements 235 (see FIG. 2) for processing or stored in memory 325 (e.g., completely in embodiments, partially in embodiments).

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
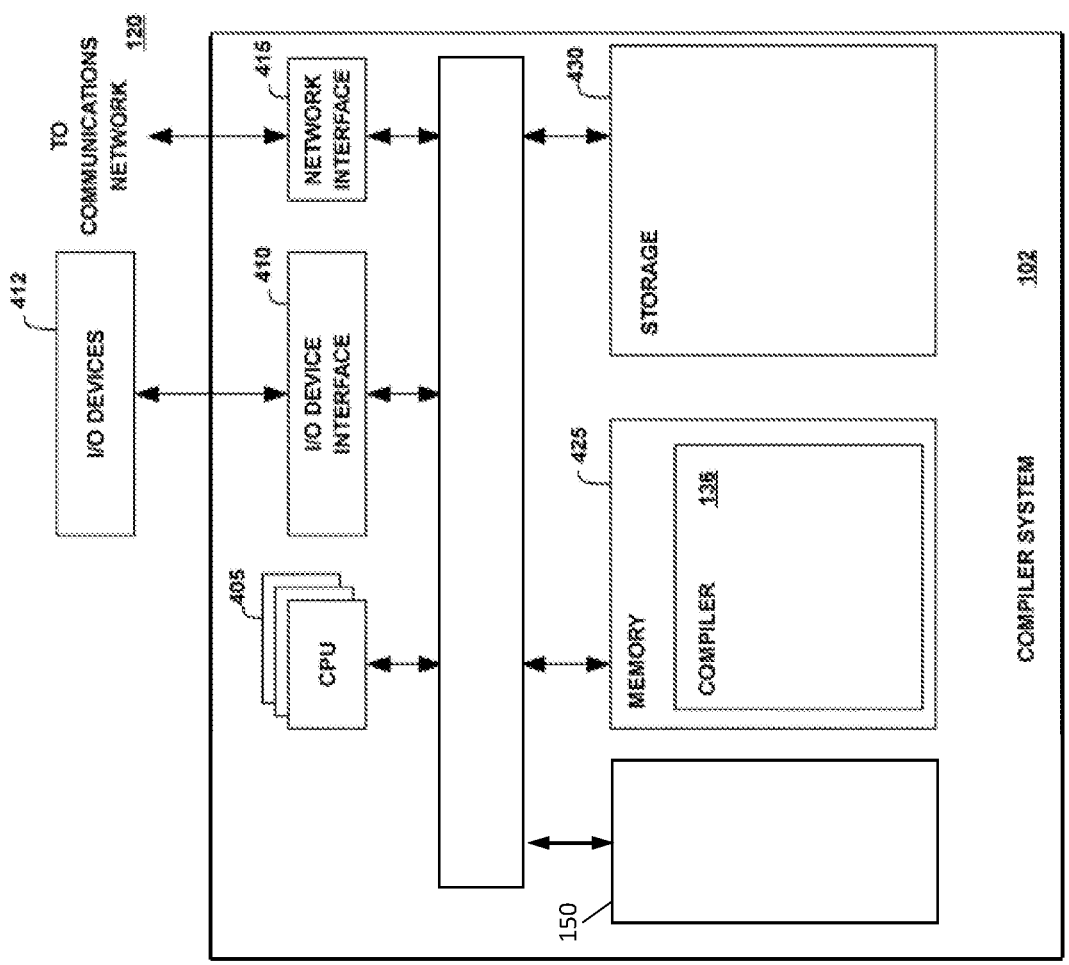
FIG. 4 illustrates a view of a compiler system according to a non-limiting embodiment.

Turning to FIG. 4, a compiler system 102 is illustrated according to a non-limiting embodiment. The compiler system 102 may include, without limitation, one or more processors (CPUs) 405, a network interface 415, an interconnect 420, a compiler controller 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the compiler controller 425 or storage 430. Similarly, each CPU 405 stores and retrieves application data residing in the compiler controller 425 or storage 430. The interconnect 420 is used to move data, such as programming instructions and application data, between the CPU 405, I/O device interface 410, storage unit 430, network interface 415, and compiler controller 425. The interconnect 420 may be one or more busses. The CPUs 405 may be a single CPU, multiple CPUs, or a single CPU having multiple processing cores in various embodiments. In one embodiment, a processor 405 may be a DSP. The compiler controller 425 generally includes a random access memory, e.g., SRAM, DRAM, or Flash, which stores instructions that can be executed by a compiler 136. The storage 430 is generally included to be representative of a non-volatile memory, such as a hard disk drive, solid state device (SSD), removable memory cards, optical storage, flash memory devices, network attached storage (NAS), connections to storage area network (SAN) devices, or to the cloud. The network interface 415 is configured to transmit data via the communications network 120.

The compiler system 102 may include an operating system. The operating system may be stored partially in the compiler controller 425 and partially in storage 430. Alternatively, an operating system may be stored entirely in the compiler controller 425 or entirely in storage 430. The operating system provides an interface between various hardware resources, including the CPU 405, and processing elements and other components of the stream computing application. In addition, an operating system provides common services for application programs, such as providing a time function.

The compiler controller 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In embodiments, a streams application bundle or streams application bundle file may be created. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple computer processes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
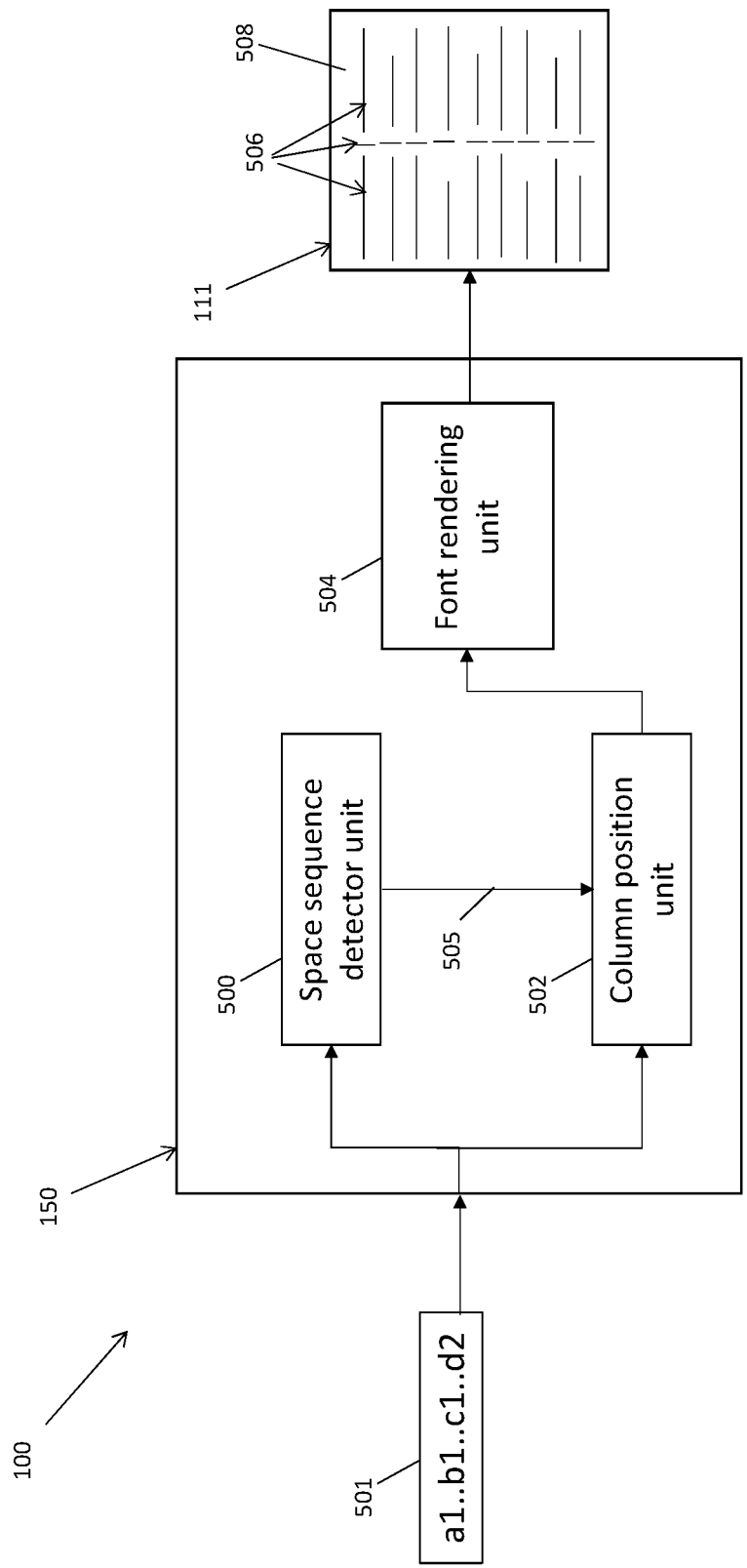
FIG. 5 is a block diagram of a text editor controller according to a non-limiting embodiment.

Turning to FIG. 5, a text editor controller 150 is illustrated according to a non-limiting embodiment. The text editor controller 150 includes a space sequence detector unit 500, a column position unit 502, and a font rendering unit 504. Any one of the space sequence detector unit 500, the column position unit 502, and the font rendering unit 504 can be constructed as an individual electronic hardware controller that includes memory and a processor configured to execute algorithms and computer-readable program instructions stored in the memory.

The space sequence detector unit 500 is configured to detect spaces entered into input data 501 input to the text editor controller 150. The detected spaces effectively serve as column delimiters, which are utilized to determine the intention to add a column into the input data 501. In examples where the input data 501 includes several individual lines of input data 501 (where an explicit line break vertically separates lines of input data 501), the space sequence detector unit 500 detects one or more column delimiters for each line (e.g., code line) of plain text. Unlike conventional systems, however, the space sequence detector unit 500 can determine the pixel position of a column independently from the remaining lines. In this manner, less computing processing is required compared to the conventional system such as those that utilize the elastic tabstops methodology.

In one or more embodiments, a column delimiter is represented as a sequence of consecutive spaces. For example, the column delimiter can include, but is not limited to, a sequence of one or more spaces at the start of a line, followed by a non-space, or a sequence of two or more spaces, followed by a non-space. The column delimiter can also exclude a period followed by two spaces (i.e. ".") to avoid having the end of a sentence be treated as the end of the column. In at least one non-limiting embodiment, the sequence of consecutive spaces includes, but is not limited to, two consecutive spaces. In response to detection of a column delimiter in the input data 501, the space sequence detector unit 500 outputs a column delimiter signal 505 indicating the location of the column delimiter and the number of spaces included in the column delimiter.

In any case, the column position unit 502 receives the column delimiter signal 505 and determines a column position of the resulting generated code based at least in part on the number of characters associated with the first column. For example, the left position of the input data 501 that comes after each delimiter can be determined by the number of characters up through and including the column delimiter. The left position of the input data 501 that comes after each delimiter can also be determined by the number of characters preceding the column. In any case, the column position unit 502 can calculate the column position based on a maximum width (Wm) that a given character can occupy. The maximum width can be determined as the largest width of any glyph used by the font, for example.

When the number of characters (i.e., "n" characters) preceding the left position of the input data 501 for a given column is determined as described above, the column position unit 502 multiplies that number of characters (n) by that maximum width (Wm) to get the pixel position of the left position of the given column. The column position unit 502 can include a memory unit (not shown) that stores column position data indicating the positions of the calculated columns. The column position data can then be obtained by the font rendering unit 504 to generate the vertically aligned proportional font, which is described in greater detail below.

Figure 6:
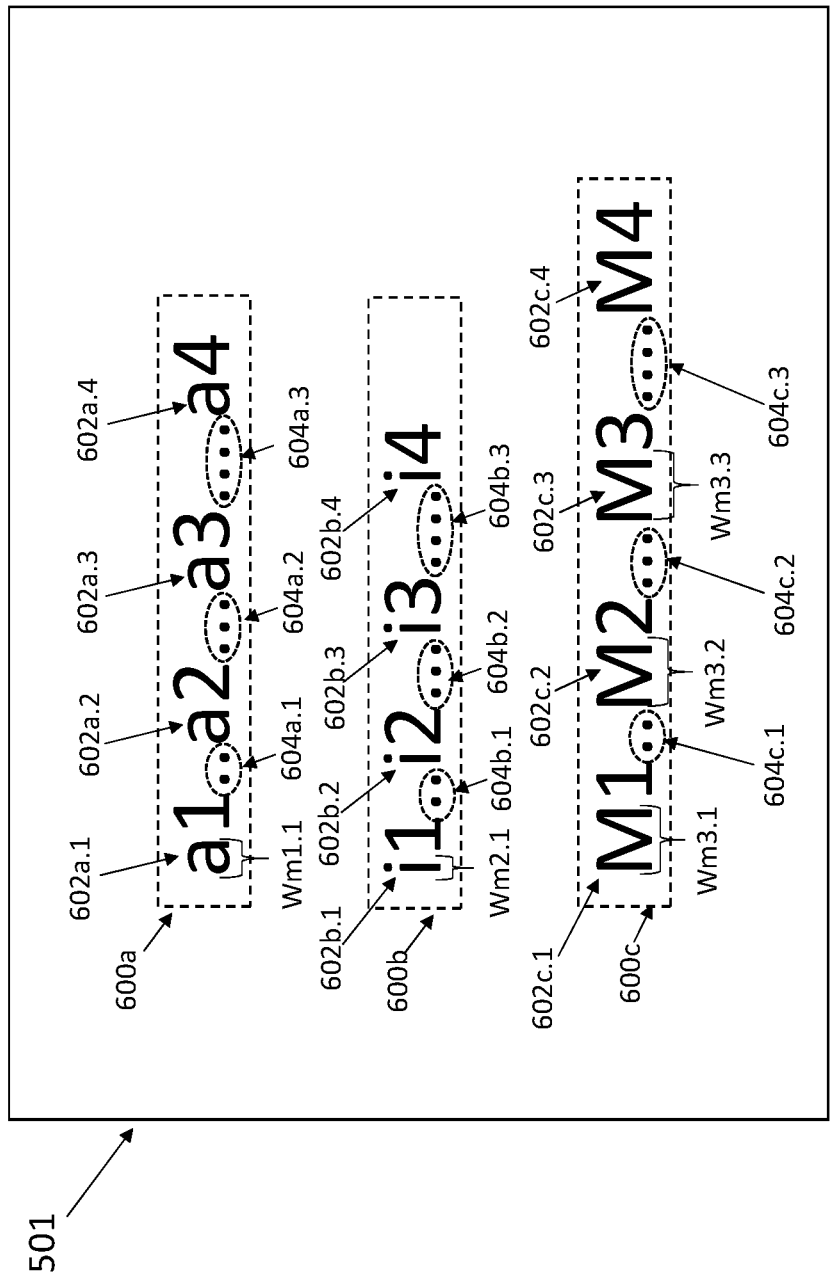
FIG. 6 illustrates several lines of input data that is formatted into vertically aligned proportional font by a text editor controller according to a non-limiting embodiment according to a non-limiting embodiment.

FIG. 6, for example, illustrates several lines 600a, 600b, 600c of input data. The input data 501 includes a plurality of sequences 602a.1, 602a.2, 602a.3, 602a.4, 602b.1, 602b.2, 602b.3, 602b.4, 602c.1, 602c.2, 602c.3, and 602c.4 of one or more characters "a1", "a2", etc., separated from one another by column delimiters (e.g., series of consecutive spaces) 604a.1, 604a.2, 604a.3, 604b.1, 604b.2, 604b.3, 604c.1, 604c.2, and 604c.3. By way of explanation here, the expression "a1" for character sequence 602a.1, for example, represents the character "a" followed immediately by the character "1". For clarity, the spaces are represented as periods ".". In at least one embodiment, "a1" for example, can qualify as a character represented by two different glyphs.

The starting position (i.e., the left boundary) of the first column containing character sequences 602a.1, 602b.1 and 602c.1 is determined by the left margin setting, as adjusted by any applicable indents. To determine the starting position (i.e., the left boundary) of the second column containing character sequences 602a.2, 602b.2 and 602c.2 (which is also the end position or right boundary of the first column containing character sequences 602a.1, 602b.1 and 602c.1), the column position unit 502 identifies the first column delimiters 604a.1, 604b.1 and 604c.1, and determines that four characters (e.g., "a", "1", "." and ".") precede the next character sequences (e.g., 602a.2, 602b.2, 602c.2) following the first column delimiters 604a.1, 604b.1 and 604c.1. In other words, the column position unit 502 determines that the number of characters in the first column, including the last space included in the first column delimiter 604a.1, is four. The column position unit 502 then determines the first column character having the greatest width as a basis for calculating the width of the first column (and thus the starting position of the second column). In this example, the width (Wm3.1) of the character "M" in 602c.1 is determined as the maximum width (Wm). Accordingly, the width of the first column located to the left of the second column character sequences 602a.2, 602b.2 and 602c.2 is calculated as the product or function of the number of preceding characters and the maximum width (Wm), or 4×(Wm3.1). In at least one embodiment, the maximum width is the maximum width of any glyph (and potential padding/kerning) in the character set. Accordingly, the resulting column position does not necessarily depend on the actual text, but instead can be determined according to the font.

The starting positions of the third column containing character sequences 602a.3, 602b.3 and 602c.3 and the fourth column containing character sequences 602a.3, 602b.3 and 602c.3 can be calculated in a similar manner as described above. For example, the column position unit 502 identifies the second column delimiters 604a.2, 604b.2 and 604c.2, and determines that nine characters (e.g., "a", "1", ".", ".", "a", "2", ".", "." And ".") precede the next character sequences (e.g., 602a.3, 602b.3, 602c.3) following the second column delimiters 604a.2, 604b.2 and 604c.2. Accordingly, the pixel position of the left boundary of the third column located to the left of the third column character sequences 602a.3, 602b.3 and 602c.3 (which is also the right boundary of the second column) can be calculated as the product or function of the number of preceding characters and the maximum width (Wm), or 9×(Wm3.2)).

Similarly, the column position unit 502 identifies the third column delimiters 604a.3, 604b.3 and 604c.3, and determines that fifteen characters (e.g., "a" "1", ".", ".", "a", "2", ".", ".", ".", "a", "3", ".", ".", ".", ".") precede the next character sequences (e.g., 602a.4, 602b.4, 602c.4) following the third column delimiters 604a.3, 604b.3 and 604c.3. Accordingly, the pixel position of the left boundary of the fourth column located to the left of the fourth column character sequences 602a.4, 602b.4 and 602c.4 (which is also the right boundary of the third column) can be calculated as the product or function of the number of preceding characters and the maximum width (Wm), or 15×(Wm3.3))

Figure 7A:
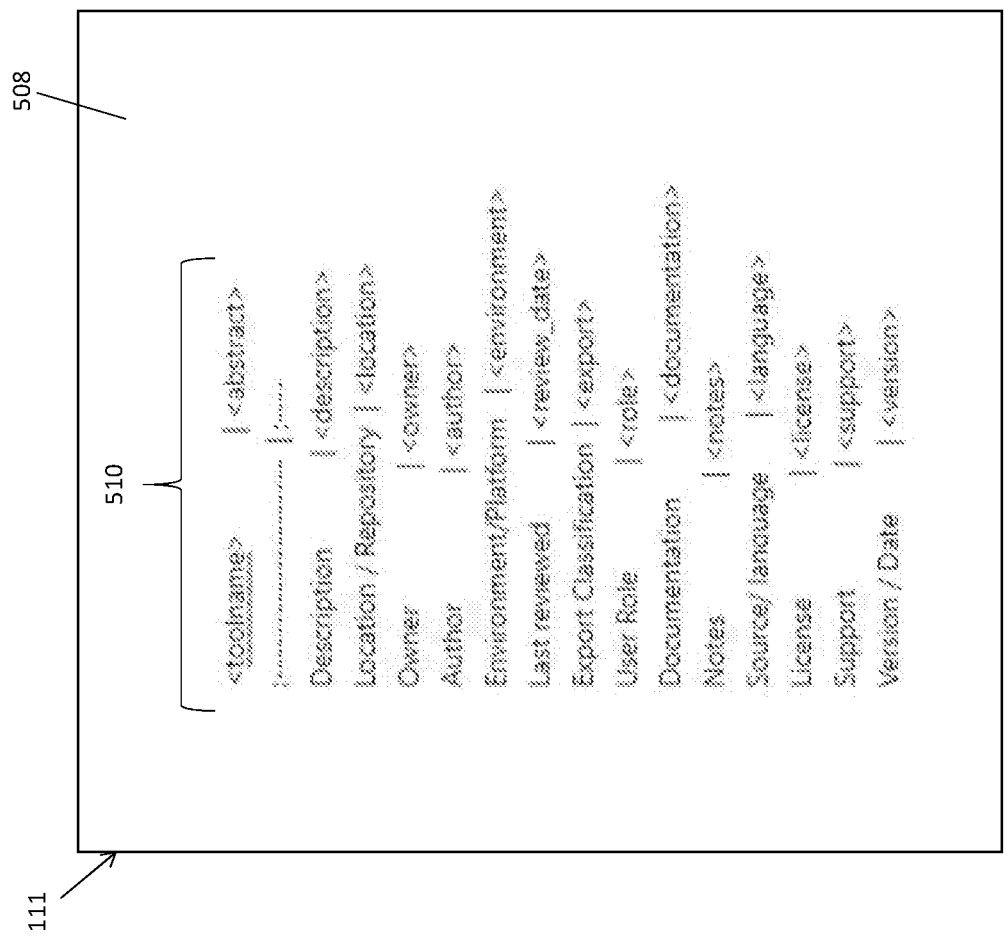
FIG. 7A is a display of proportional font.
Figure 7B:
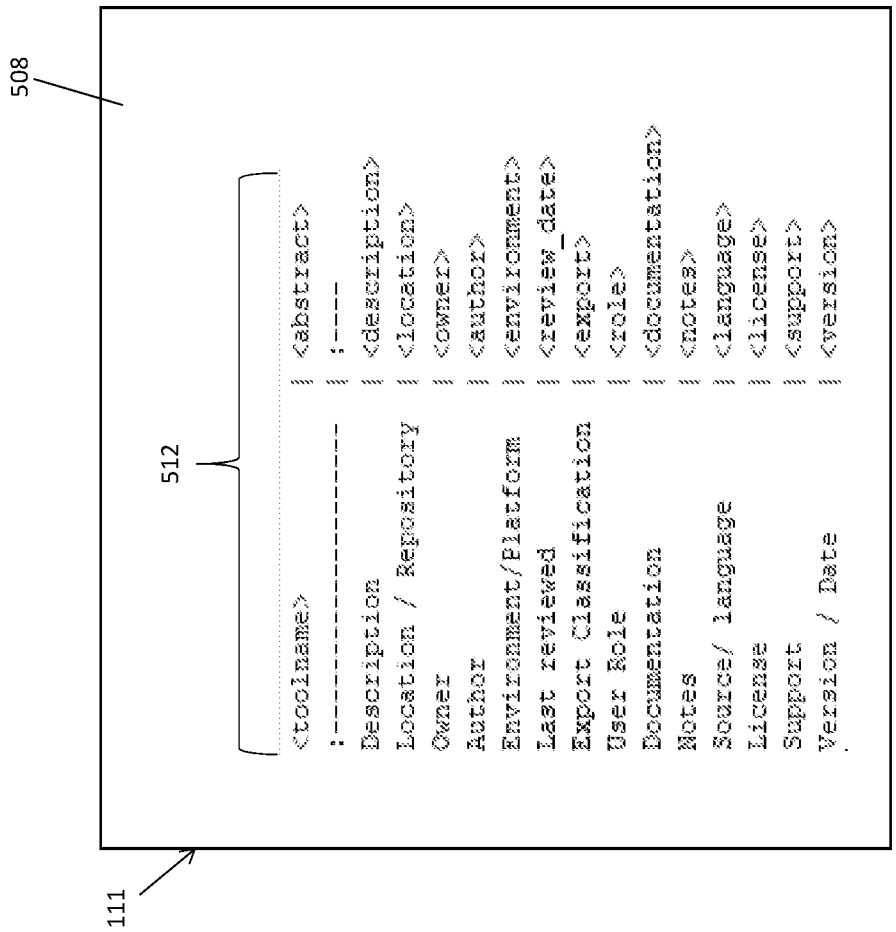
FIG. 7B is a display of monospaced type.
Figure 7C:
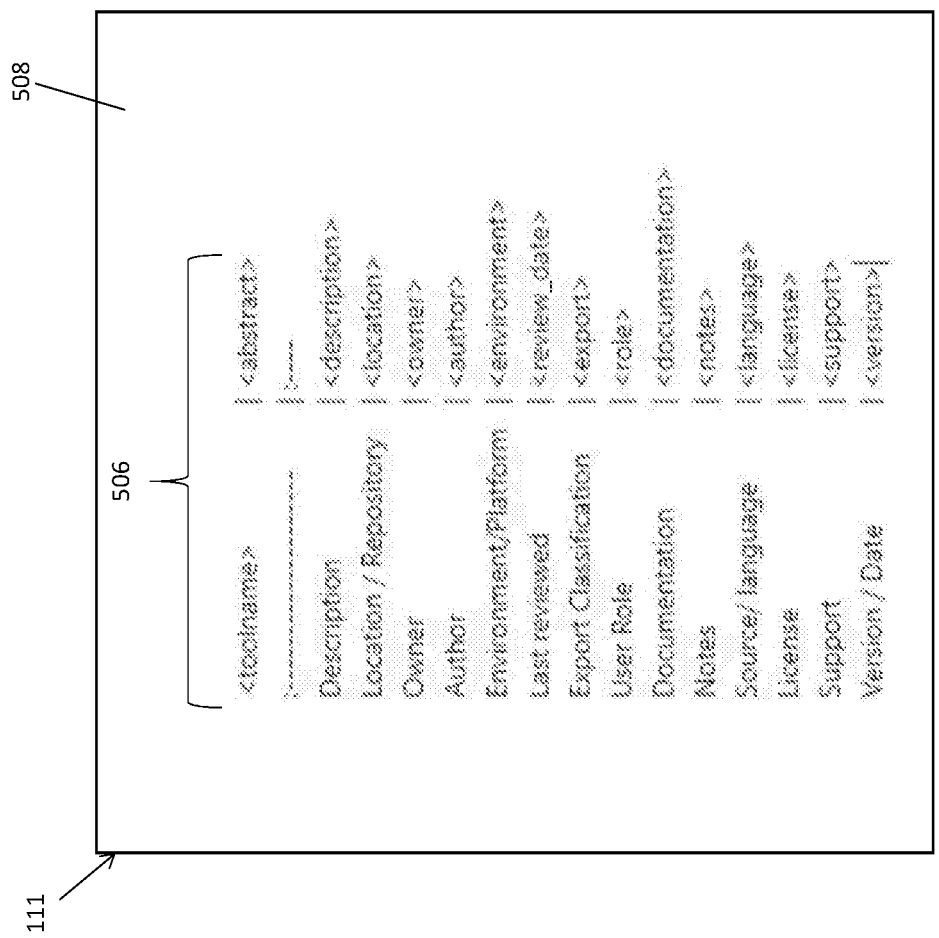
FIG. 7C is a display of vertically aligned proportional font according to a non-limiting embodiment.

Referencing again FIG. 5, the font rendering unit 504 can render the input data 501 into a displayable proportional font 506. The display device 111 receives the rendered proportional font 506 and displays it in a text area interface 508 generated by the computer system 100. Unlike conventional systems where the displayed proportional font 510 is vertically misaligned (see FIG. 7A), the font rendering unit 504 generates the proportional font 506 according to the column positions determined by the column position unit 502. In this manner, the rendered proportional font 506 generated according to the column location data is displayed in a vertically aligned manner on the display device 111 (see FIG. 7C), as opposed to a conventional misaligned proportional font 520 (see FIG. 7A) or a monospaced font 512 which reduces readability (see FIG. 7B).

In at least one embodiment, the font rendering unit 504 can employ an interface that includes an editable HTML table positioned over the text display area. When a column delimiter is detected (i.e., the end of a sequence of spaces is reached), a table cell is created with the scanned characters and the colspan (i.e., the number of columns the table cell spans) set equal to the number of characters in a given column. The font rendering unit 504 then clears the "scan buffer" and the scan/cell-building process is repeated with the remaining characters in the line. That same process repeats for each line of text and the corresponding row.

Figure 8:
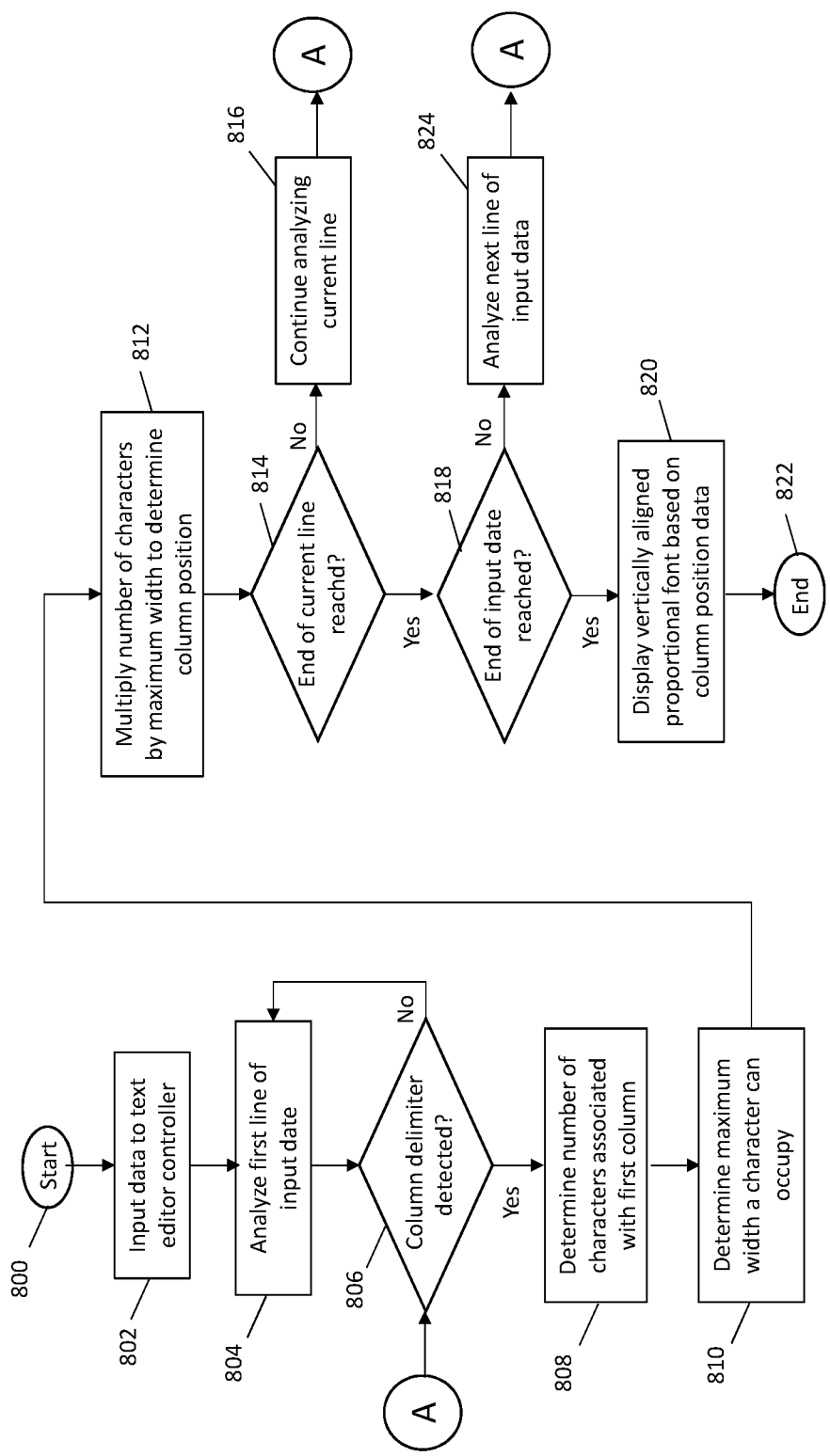
FIG. 8 is a flow diagram illustrating a method of aligning proportional font text located in same columns according to a non-limiting embodiment.

With reference now to FIG. 8, a method of aligning proportional font text located in a shared column is illustrated according to a non-limiting embodiment. The method begins at operation 800, and at operation 802 input data is input to the text editor controller. At operation 804, the text editor controller analyzes a first line of the input data. At operation 806, a determination is made as to whether a column delimiter is detected. In at least one non-limiting embodiment, a column delimiter is represented in the input data as a series of consecutive spaces. When a column delimiter is not detected, the operation returns to operation

804 and continues analyzing the current line of data. When, however, a column delimiter is detected, the number of characters associated with the detected column delimiter is determined at operation 808. At operation 810, the maximum width (Wm) a character can occupy is determined. At operation 812, the column position associated with the number of characters is determined. In at least one embodiment, the column position is determined by multiplying the number of determined characters in both the column delimiter and the preceding character sequence by the maximum width.

At operation 814, a determination is made as to whether the end of the current line is reached. When the end is not reached, the method continues analyzing the current line at operation 816. When, however, the end of the current line is reached a determination is made as to whether the end of the input data is reached at operation 818. When the end of the input data is not reached, the method proceeds to analyze the next line of the input data at operation 824. When, however, the end of the input data is reached, the input data is formatted according to the determined column positions to generate the formatted proportional font text, and the formatted proportional font text is displayed in a vertical alignment at operation 820. The method then ends at operation 822.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising:
   a text editor controller configured to receive input data, to determine column location data indicating a location of at least one column for vertically organizing at least a portion of the input data based at least in part on the input data, and to render the input data as proportional font, wherein the column location data is determined prior to rendering the input data as proportional font; and
   a display device in signal communication with the text editor controller, the display device configured to display a text area interface generated by the computer system, and to display the rendered proportional font in the text area interface in a vertically aligned manner based at least in part on the column location data.

2. The computer system of claim 1, wherein the column location data indicates a location of at least one shared column that organizes the rendered proportional font.

3. The computer system of claim 2, wherein the rendered proportional font is included in a plurality of vertically spaced lines organized in the at least one shared column.

4. The computer system of claim 3, wherein the text editor controller detects at least one column delimiter included in the input data, and generates the column location data based at least in part on the at least one column delimiter and at least one character of the input data that precedes the at least one column delimiter.

5. The computer system of claim 4, wherein the at least one column delimiter is a sequence of consecutive spaces generated prior to rendering the input data as proportional font.

6. The computer system of claim 5, wherein the text editor controller determines a maximum width at which characters included in a given column are capable of occupying in the at least one shared column, and calculates the column location as a function of the maximum width and a number of characters corresponding to the at least one column delimiter.

7. The computer system of claim 6, wherein the text editor controller comprises:
   a space sequence detector unit configured to identify a presence of the at least one column delimiter in the input data in response to detecting the sequence of consecutive spaces, and to output a column delimiter signal indicating a location of the sequence of consecutive spaces in the input data;
   a column position unit in signal communication with the space sequence detector to receive the column delimiter signal, and configured to calculate the column location of the at least one shared column; and
   a font rendering unit configured to render the input data into the proportional font, and to output the rendered proportional font according to the column location of the at least one shared column such that rendered proportional font is automatically displayed in the vertically aligned manner in the text area interface.

8. A method of rendering text data into proportional font, the method comprising:
   inputting the text data to a text editor controller;
   determining column location data, via the text editor controller, indicating a location of at least one column for vertically organizing at least a portion of the input data based at least in part on the input data;
   rendering, via the text editor controller, the input data as proportional font;
   generating, via a computer system, a text area interface generated by a computer system; and
   displaying, via a display device, the rendered proportional font in the text area interface in a vertically aligned manner based at least in part on the column location data,
   wherein determining the column location data is performed prior to rendering the input data as proportional font.

9. The method of claim 8, wherein the column location data indicates a location of at least one shared column that organizes the rendered proportional font.

10. The method of claim 9, further comprising displaying the rendered proportional font in a plurality of vertically spaced lines that are organized in the at least one shared column.

11. The method of claim 10, further comprising:
    detecting, via the text editor controller, at least one column delimiter included in the input data; and
    generating, via the text editor controller, the column location data based at least in part on the column delimiter and at least one character of the input data that precedes the column delimiter.

12. The method of claim 11, wherein the at least one column delimiter is a sequence of consecutive spaces generated prior to rendering the input data as proportional font.

13. The method of claim 12, further comprising:
    determining, via the text editor controller, a maximum width at which characters included in a given column are capable of occupying in the at least one shared column; and
    calculating, via the text editor controller, the column location as a function of the maximum width and a number of characters corresponding to the column delimiter.

14. The method of claim 13, further comprising:
  identifying, via a space sequence detector unit, a presence of the at least one column delimiter in the input data in response to detecting the sequence of consecutive spaces;
  outputting, via the space sequence detector unit, a column delimiter signal indicating a location of the sequence of consecutive spaces in the input data;
  calculating, via a column position unit, the column location of the at least one shared column; and
  rendering, via a font rendering unit, the input data into the proportional font; and
  outputting, via the font rendering unit, the rendered proportional font according to the column location of the at least one shared column such that rendered proportional font is automatically displayed in the vertically aligned manner in the text area interface.

15. A computer program product comprising a computer readable storage medium having program instructions embodied therewith the program instructions executable by a computer processor to cause the computer processor to perform a method of rendering text data into proportional font, the method comprising:
  inputting the text data to a text editor controller;
  determining column location data, via the text editor controller, indicating a location of at least one column for vertically organizing at least a portion of the input data based at least in part on the input data;
  rendering, via the text editor controller, the input data as proportional font;
  generating, via a computer system, a text area interface;
  displaying, via a display device, the rendered proportional font in the text area interface in a vertically aligned manner based at least in part on the column location data,
  wherein determining the column location data is performed prior to rendering the input data as proportional font.

16. The computer program product of claim 15, wherein the column location data indicates a location of at least one shared column that organizes the rendered proportional font.

17. The computer program product of claim 16, the method further comprising displaying the rendered proportional font in a plurality of vertically spaced lines that are organized in the at least one shared column.

18. The computer program product of claim 17, the method further comprising:
  detecting, via the text editor controller, at least one column delimiter included in the input data; and
  generating, via the text editor controller, the column location data based at least in part on the column delimiter and at least one character of the input data that precedes the column delimiter.

19. The computer program product of claim 18, the method further comprising:
  determining, via the text editor controller, a maximum width at which characters included in a given column are capable of occupying in the at least one shared column; and
  calculating, via the text editor controller, the column location as a function of the maximum width and a number of characters corresponding to the column delimiter.

20. The computer program product of claim 19, the method further comprising:
  identifying, via a space sequence detector unit, a presence of the at least one column delimiter in the input data in response to detecting a sequence of consecutive spaces included in the input data prior to rendering the input data as proportional font;
  outputting, via the space sequence detector unit, a column delimiter signal indicating a location of the sequence of consecutive spaces in the input data;
  calculating, via a column position unit, the column location of the at least one shared column; and
  rendering, via a font rendering unit, the input data into the proportional font; and
  outputting, via the font rendering unit, the rendered proportional font according to the column location of the at least one shared column such that rendered proportional font is automatically displayed in the vertically aligned manner in the text area interface.

* * * * *